United States Patent [19]

Nagano et al.

[11] Patent Number: 5,594,709
[45] Date of Patent: Jan. 14, 1997

[54] REPRODUCING DEVICE HAVING INDEX SEARCH FUNCTION AND ACCESS METHOD THEREFOR

[75] Inventors: Shuichi Nagano; Kenji Tomizawa, both of Kanagawa, Japan

[73] Assignee: Sony Corporation, Tokyo, Japan

[21] Appl. No.: 558,915

[22] Filed: Nov. 13, 1995

[30] Foreign Application Priority Data

Nov. 30, 1994 [JP] Japan .................................. 6-319493

[51] Int. Cl.$^6$ ........................................................ G11B 7/00
[52] U.S. Cl. .................................................. 369/32; 369/47
[58] Field of Search ................................. 369/32, 44.28, 369/48, 54, 58, 53, 47

[56] References Cited

U.S. PATENT DOCUMENTS 5,122,886  6/1992  Tankaka ................................. 369/47
5,177,720  1/1993  Kondo ................................... 369/48

Primary Examiner—Nabil Hindi
Attorney, Agent, or Firm—William S. Frommer; Alvin Sinderbrand

[57] ABSTRACT

A reproducing device which is capable of performing an index search on both a recording medium on which an index point to subdivide a program is beforehand recorded together with programs, and a recording medium on which no index point is beforehand recorded.

11 Claims, 13 Drawing Sheets

FIG. 1

| PHYSICAL FORMAT | CD-ROM (XA) |
|---|---|
| DIGITAL VIDEO | based on MPEG1<br><br>pixel dimension (number of pixels)/frame frequency :<br>    352×240/29.97Hz (NTSC)<br>    352×240/23.976Hz (FILM)<br>    352×288/25Hz (PAL)<br><br>data transmission rate :<br>    maximum 1.152Mbits/second |
| DIGITAL AUDIO | MPEG 1 layer 2<br><br>standardized frequency : 44.1KHz<br><br>data transmission rate : 224Kbits/second (from track 2 on)<br>64, 96, 128, 192, 224, 384Kbits/second (track 1) |
| REPRODUCTION TIME | maximum 74 minutes |
| NUMBER OF PIXELS OF STILL PICTURE | standard level : 352×240 (NTSC)<br>               352×288 (PAL)<br>highly fine level : 704×480 (NTSC)<br>                704×576 (PAL) |
| REPRODUCTION MODE | normal reproduction, slow, pose, etc.<br>menu reproduction using playback control |
| VIDEO SIGNAL OUTPUT | NTSC/PAL |
| APPLIED FIELD | movie, Karaoke, music, education, album for photographs |

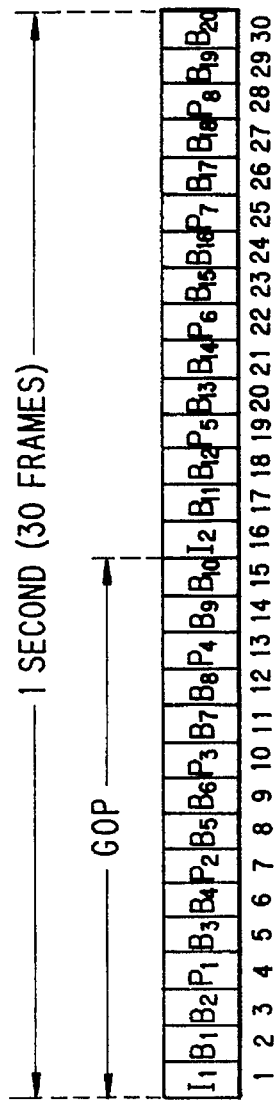
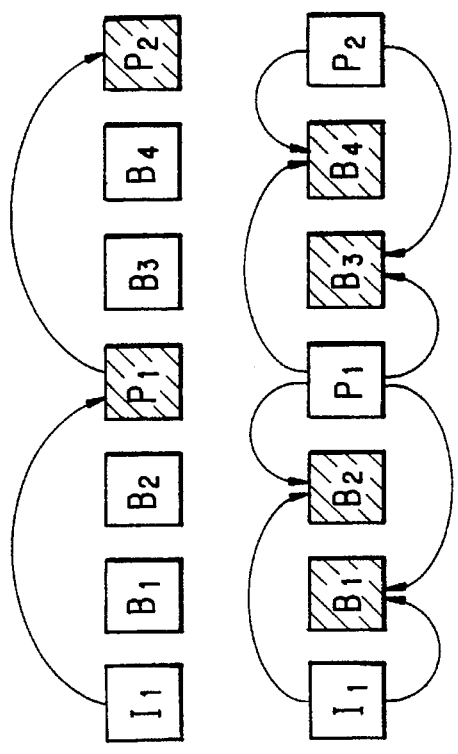
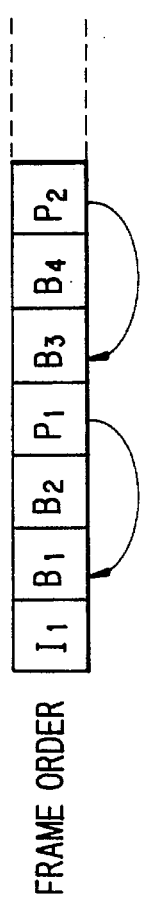
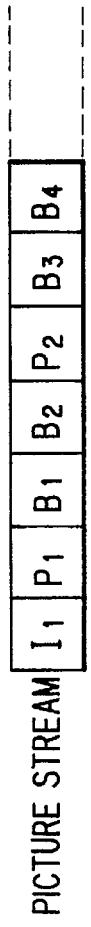
FIG.3A  FIG.3B  FIG.3C  FIG.3D  FIG.3E

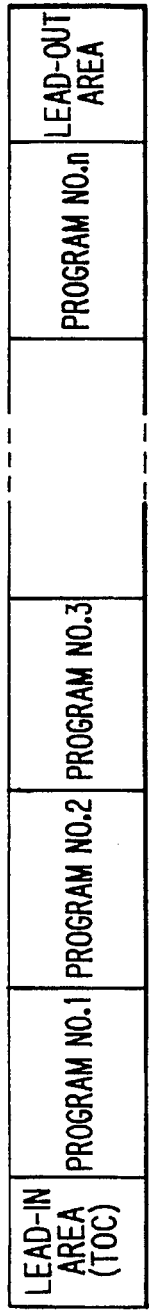
*FIG. 5A* CD-DA
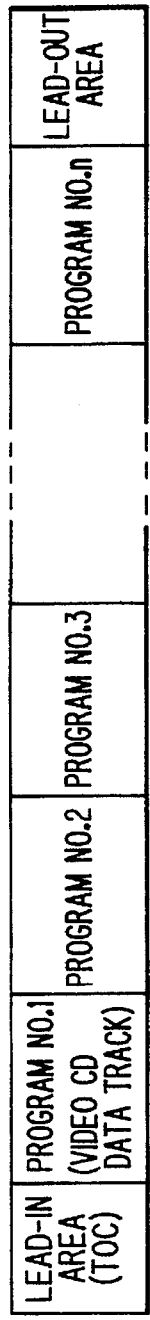
*FIG. 5B* VIDEO CD
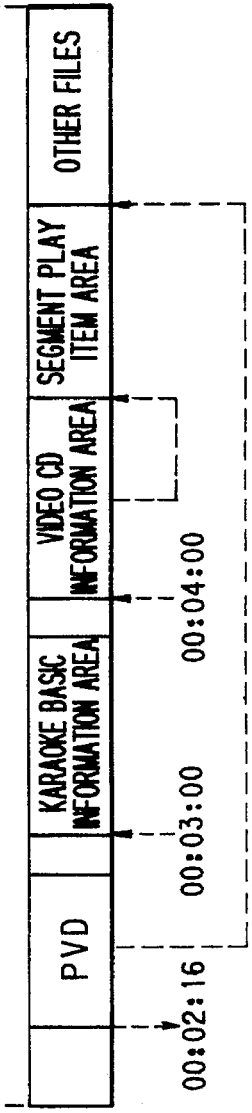
*FIG. 5C*

FIG. 7A

ENTRY TABLE

| | ENTRY ET₁ | ENTRY ET₂ | ENTRY ET₃ |
|---|---|---|---|
| | TRK\|AMIN\|ASEC\|AFRM | TRK\|AMIN\|ASEC\|AFRM | TRK\|AMIN\|ASEC\|AFRM |

FIG. 7B

PROGRAM NO.2  PROGRAM NO.3  PROGRAM NO.4  PROGRAM NO.5  PROGRAM NO.6  PROGRAM NO.7  PROGRAM NO.8

| ET₁ | ET₂ | ET₃ | ET₄ | ET₅ | ET₆ | ET₇ |
|---|---|---|---|---|---|---|
| 02\|00\|20\|00 | 03\|04\|11\|53 | 04\|07\|30\|01 | 05\|10\|15\|20 | 06\|14\|31\|25 | 07\|20\|21\|03 | 08\|25\|41\|31 |
| (SP₂) | (SP₃) | (SP₄) | (SP₅) | (SP₆) | (SP₇) | (SP₈) |

FIG. 7C

PROGRAM NO.2   PROGRAM NO.3   PROGRAM NO.4

| ET₁ | ET₂ | ET₃ | ET₄ | ET₅ | ET₆ | ET₇ |
|---|---|---|---|---|---|---|
| 02\|00\|20\|00 | 02\|05\|14\|33 | 03\|10\|15\|04 | 03\|15\|16\|15 | 03\|18\|21\|25 | 03\|25\|35\|41 | 04\|30\|31\|16 |
| NO.2 START POINT (SP₂) | NO.2 INDEX POINT (IDX₂₁) | NO.3 START POINT (SP₃) | NO.3 INDEX POINT (IDX₃₁) | NO.3 INDEX POINT (IDX₃₂) | NO.3 INDEX POINT (IDX₃₃) | NO.4 START POINT (SP₄) |

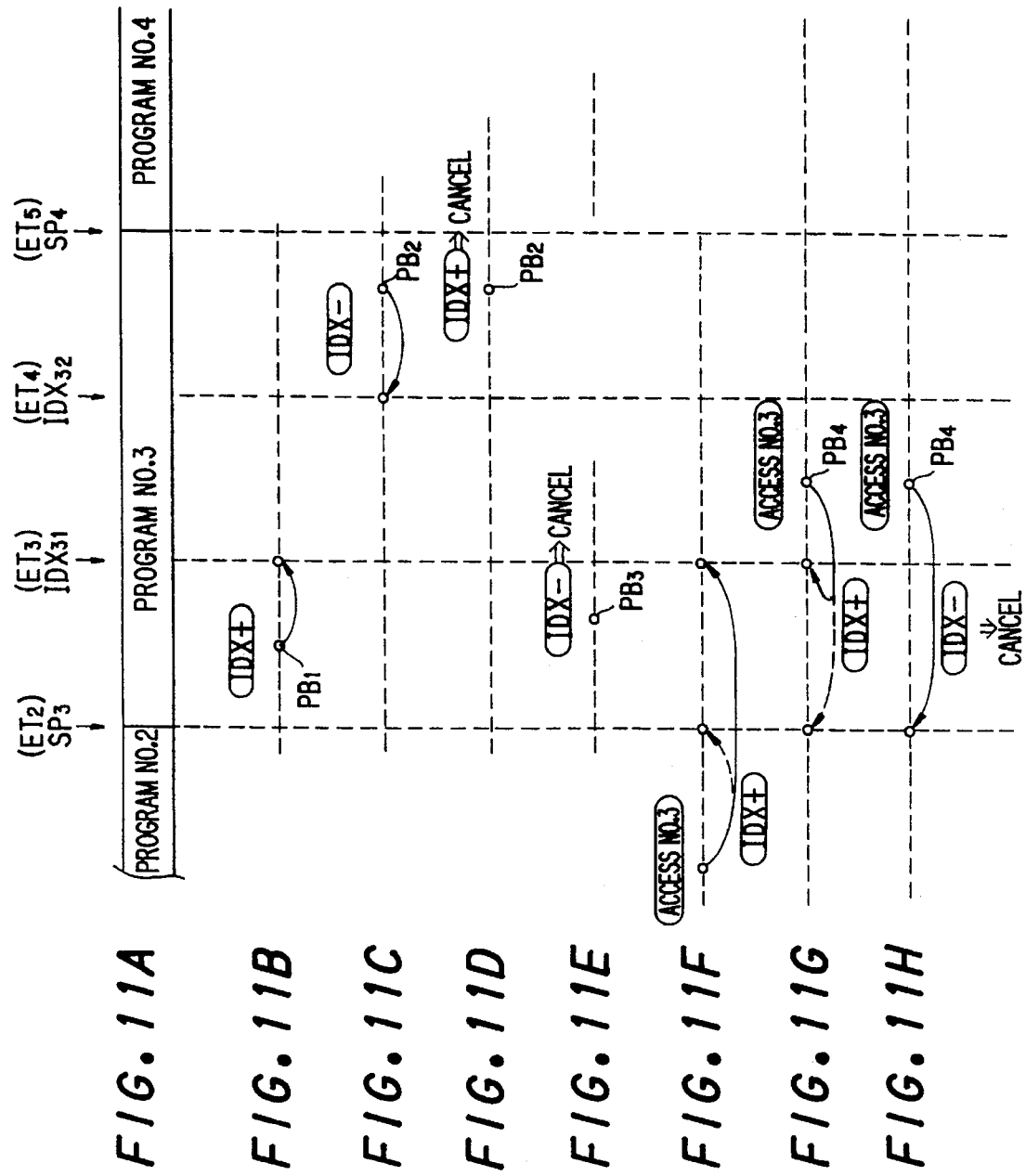

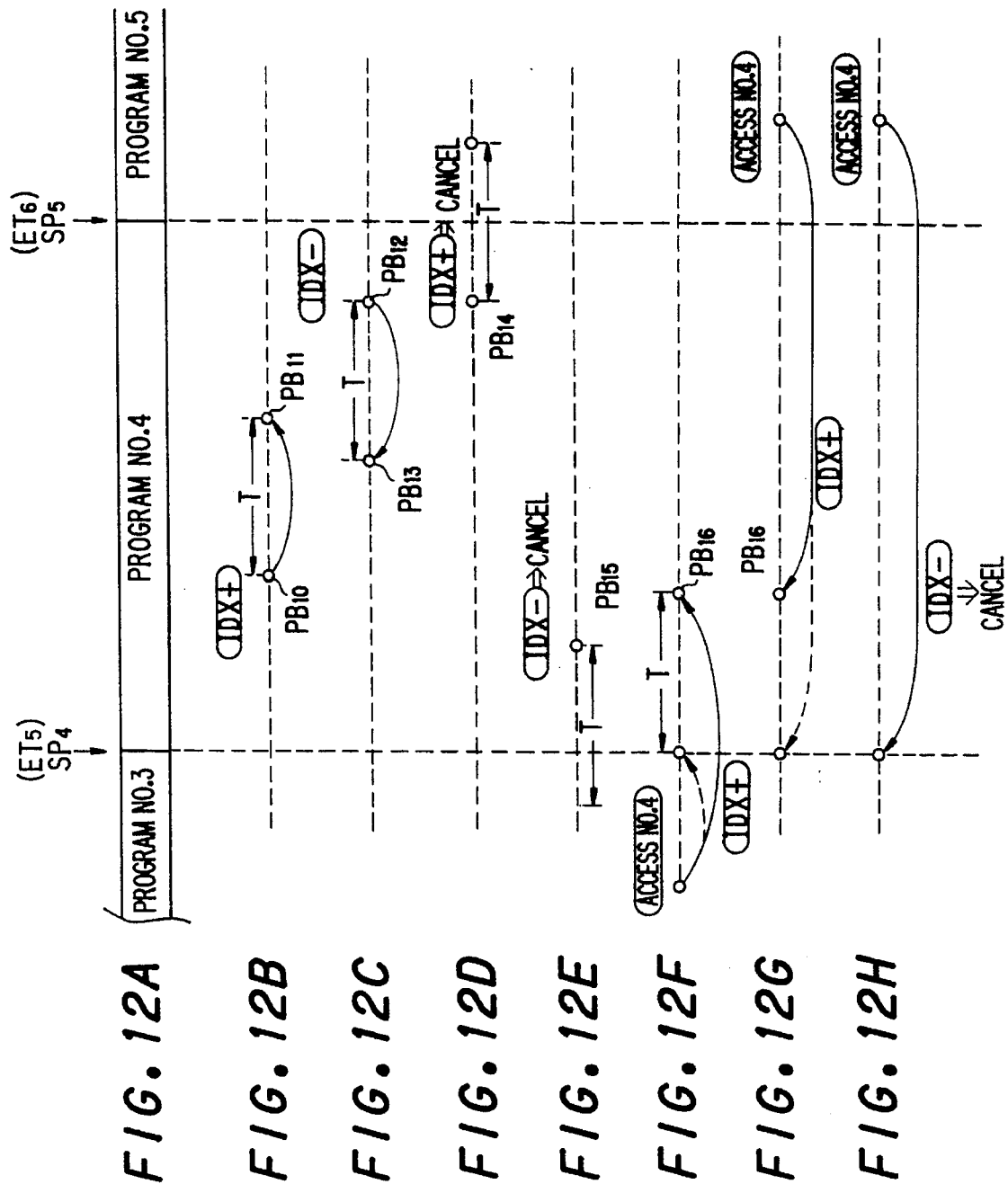

REPRODUCING DEVICE HAVING INDEX SEARCH FUNCTION AND ACCESS METHOD THEREFOR

BACKGROUND OF THE INVENTION

1. Field of the Invention

The present invention relates to a reproducing device which is suitably used for disc-shaped recording media such as CD-DA which is a so-called digital audio compact disc, a video CD, etc.

2. Description of the Related Art

Various read only memory type disc media (used exclusively for reproduction) such as CD-DA, video CD, etc. have propagated in the market. The CD-DA is designed so that an user can record digital audio data of pieces of music, etc. thereon and then reproduce the recorded data to enjoy these pieces of music with high sound quality. In addition, as a derivative of the CD-DA has been known CD-G (so-called CD-Graphics) in which still image data are recorded in a sub code data.

Furthermore, there has been also developed a video CD which is based on a format of the CD-ROM and in which video data as well as digital audio data are recorded.

In the various discs as described above, audio information or video information is recorded on a program basis (i.e., a recording unit of these information corresponds to a program). For example, in the case of a CD-DA having ten pieces of music, each piece of music corresponds to a program, and in this sense ten programs are regarded as being recorded on the CD-DA. The same is applied to the video CD. For example, in the case of a video CD having ten, chapters, each chapter corresponds to a program, and thus ten chapters are recorded on the video CD.

Furthermore, when a disc producer wants to subdivide a program, he can add index information to the disc. With respect to the CD-DA, index information is added every program, and thus reproduction can be performed from any index number of any program number through an user's index access operation. In the CD-DA, the number of index information pieces of respective parts to which the program is subdivided is recorded, however, address information of each subdivided index point is not recorded.

When an index access is instructed, it must be checked at a reproducing device side whether there is any index-number varying point in a program which is being produced when the index access is instructed, in order to search the head of the index point.

The above search operation needs a long time, and thus there is a disadvantage that a desired index point cannot be rapidly accessed.

In the case of the video CD, an user may also access an index point in a desired chapter by adding index information, for example, when a long reproduction time is needed For a chapter because video information is a movie or the like. In order to enable this operation, an address point called as "entry address" is recorded every chapter, and then it is used as index information to perform a reproducing operation from a desired index number of a desired chapter.

The index information is preset in accordance with intention of a disc producer, and thus a number of discs having no index information are actually put on the market.

As described above, if index information is preset in a disc, an user can readily start reproduction of his desired program even from a middle portion of the program. However, if no index information is preset in the disc, he must advance the frames of a picture by actuating a cue/review (quickly reproducing operation) key or the like to start the reproduction of his desired program from a middle portion thereof. In order to perform the quickly reproducing operation, the user must continue to push an operation button until his desired frame appears. Therefore, this has been a remarkably unfavorable operation in usability and visibility.

SUMMARY OF THE INVENTION

The present invention has been implemented in view of the foregoing problems, and an object of the present invention is to enable a program having no index information to be subjected to the same operation as a normal index access, thereby improving usability.

In order to attain the above object, according to the present invention, a reproducing device for reproducing a recording medium on which plural programs and management information to manage the plural programs are recorded, includes a reproducer for reproducing the management information and the programs from the recording medium, a detector for detecting, on the basis of the management information reproduced in the reproducer, whether index information to further subdivide the programs are recorded on the recording medium, an index access operator for instructing an access to an index point on a desired program, a calculator for judging on the basis of a result from the detector whether index information exists in a program serving as an index access target when the index access operator is instructed, and setting an index point through a predetermined calculation processing when no index information exists in the program serving as the index access target, and a controller for performing control so as to access to the set index point.

BRIEF DESCRIPTION OF THE DRAWINGS

FIG. 1 is a table showing a format for a video CD;

FIG. 3A is a diagram showing I-picture, P-picture and B-picture which are arranged in a prescribed frame;

FIG. 3B is a diagram showing a method of generating P-picture;

FIG. 3C is a diagram showing a method of generating B-picture;

FIG. 3D is a diagram showing an output format from a decoder;

FIG. 3E is a diagram showing an input format to an encoder;

FIG. 5A is a diagram showing a data structure on a CD-DA disc;

FIG. 5B is a diagram showing a data structure on a video CD disc;

FIG. 5C is a diagram showing a data structure of a data track on the video CD;

FIG. 7A is a diagram showing data recorded in an entry table of the video CD;

FIG. 7B is a diagram showing an example of the entry table when no index track exists;

FIG. 7C is a diagram showing an example of the entry table when an index track exists;

FIG. 11A is a schematic diagram on a disc having an index track of the embodiment;

FIG. 11B is a schematic diagram on a disc when an index search is carried out in a forward direction in the embodiment;

FIG. 11C is a schematic diagram on a disc when the index search is carried out in a reverse direction in the embodiment;

FIG. 11D is a schematic diagram on a disc when a next program is accessed in the index search in the forward direction;

FIG. 11E is a schematic diagram on a disc when a previous program is accessed in the index search in the reverse direction;

FIG. 11F is a schematic diagram on a disc when the index search in the forward direction is instructed during the program access in the forward direction;

FIG. 11G is a schematic diagram on a disc when the index search in the forward direction is instructed during the program access in the reverse direction;

FIG. 11H is a schematic diagram on a disc when the index search in the reverse direction is instructed during the program access in the reverse direction;

FIG. 12A is a schematic diagram on a disc when no index track exists;

FIG. 12B is a schematic diagram on a disc when the index search is carried out in the forward direction;

FIG. 12C is a schematic diagram on a disc when the index search is carried out in the reverse direction;

FIG. 12D is a schematic diagram on a disc when a next program is accessed in the case where the index search in the forward direction is carried out;

FIG. 12E is a schematic diagram on a disc when a previous program is accessed in the case where the index search in the reverse direction is carried out;

FIG. 12F is a schematic diagram on a disc when the index search in the forward direction is instructed during the program access in the forward direction;

FIG. 12G is a schematic diagram on a disc when the index search in the forward direction is instructed during the program access in the reverse direction;

FIG. 12H is a schematic diagram on a disc when the index search in the reverse direction is instructed during the program access in the reverse direction;

DETAILED DESCRIPTION OF THE PREFERRED EMBODIMENTS

Preferred embodiments according to the present invention will be described hereunder with reference to the accompanying drawings.

Hereunder, a reproducing device in which reproduction of video/audio can be performed for video CD, CD-DA and CD-G will be described as an embodiment of the present invention in the following order: 1. Data format of video CD 2. Track structure of video CD 3. Arrangement on a disc of video CD 4. Data track of video CD 5. Outline of reproducing device 6. Circuit block of reproducing device 7. Index search operation

[1. Data Format of Video CD]

In a video CD format, the MPEG 1 system (Moving Picture Expert Group Phase 1) which is standardized as a high-efficient coding technique is applied to a CD-ROM format to enable reproduction of moving pictures and audio which continue for 60 minutes off more. The video CD is useful for domestic software such as music, movies, Karaoke, etc. and also it is usable as education software, electronic publication software, game soften, are, etc. In the video CD, with respect to data of moving pictures, they are compressed by the MPEG system. and with respect to audio data, they are usually recorded while compressed until about ⅙ (224 kbps) of CD-DA (1.4 Mbps). In addition, management data required for reproduction are recorded in a predetermined area.

FIG. 1 shows a data Format of video CD (XA specification).

Figure 2:
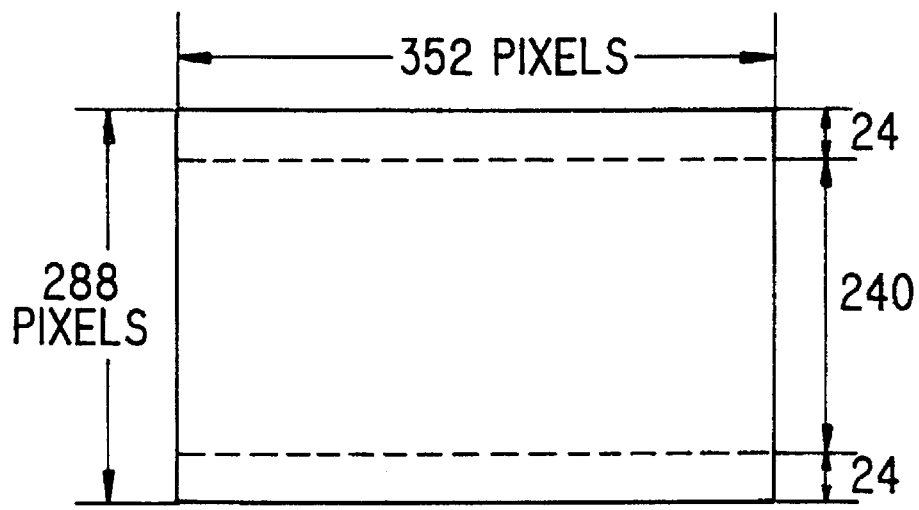
FIG. 2 is a diagram showing a frame size of NTSC/PAL.

As apparent From FIG. 1, a recording Format of video and audio is as follows: 1.152 Mbit/sec is allocated to video data, and 64 Kbit/sec to 384 Kbit/sec is allocated to audio data. In the foregoing description, the audio data of the video CD is set to about ⅙ (224 kbps) of the data transmission rate (1.4 Mbps) of CD-DA, however, the manufacture side can freely select a value ranging from 64 Kbps to 384 Kpbs in accordance with the amount of picture information. The pixel dimension (the number of pixels) of the video data (moving picture) is set to 352×240 pixels for NTSC (National Television System Committee) signals (29.97 Hz) and films (23.976 Hz), and to 352×288 pixels for PAL (Phase Alternation by line System) signals (25 Hz), that is, it is set as shown in FIG. 2.

Furthermore, the number of pixels of a still image is set to 352×240 pixels at a standard level and 704×480 pixels at a highly Fine level for the NTSC system. On the other hand, it is set to 352×288 pixels as a standard level and 704×576 pixels at a highly fine level for the PAL system.

The compression coding of the video data (moving picture) by the MPEG 1 system is performed as follows. Assuming that video signals before compressed are based on the NTSC system, video signals of 30 frames are reproduced for one second according to the NTSC system.

In the MPEG 1 system, one frame is divided into 330 blocks totally, that is, 22 blocks in a lateral direction and 15 blocks in a longitudinal direction on a plane. The data of each block is subjected to DCT (Discrete Cosined Transfer), and further subjected to requantization by setting high-band components to zero, thereby reducing the number of bits. The order of blocks is rearranged so that the blocks are arranged in zigzag form from the upper left side of one frame, and a run length coding is performed to Further reduce the number of bits.

With respect to each frame of video signals which are compressed as described above, frames after and before a predetermined Frame on time axis are remarkably correlated to each other as video information, and the information is further compressed by using the correlation, whereby three kinds of video data each having different compressibility are provided. These three kinds of video data are called as I-picture (Intra Picture), P-picture (Predicted Picture) and B-picture (Bidirectionally predicted Picture).

In each of 30 frames existing For one second, I-picture, P-picture and B-picture are generally arranged as shown in FIG. 3A. As shown in FIG. 3A, Z-pictures $I_1$ and $I_2$ are provided at an interval of 15 frames, and eight P-pictures $P_1$ to $P_8$ and twenty B-pictures $B_1$ to $B_{20}$ are arranged as shown in FIG. 3A. A section From an I-picture until a Frame just before a next I-picture is called as "GOP (Group of Picture)".

The I-picture is normal image data which are coded by DCT (Discrete Cosined Transfer).

The P-picture is formed by coding the nearest I-picture or P-picture with a movement: compensation as shown in FIG. 3B. For example, the P-picture $P_1$ is formed on the basis of the I-picture $I_1$ and the P-picture $P_2$ is formed on the basis of the P-picture $P_1$.

Therefore, the P-picture is data which are more compressed than the I-picture. If any error occurs in data of the just-before I-picture or P-picture (used as base data), the error may be also transferred to a newly-formed P-picture because the P-picture is formed on the basis of the just-before I-picture or P-picture.

The B-picture is formed on the basis of both past and future I-pictures or P-pictures as shown in FIG. 3C. For example, as shown in FIG. 3C, B-pictures $B_1$ and $B_2$ are formed on the basis of the I-picture $I_1$ and the P-picture $P_1$, and B-pictures $B_3$ and $B_4$ are Formed on the basis of the P-picture $P_1$ and the P-picture $P_2$.

The B-picture is the most compressed data in the three kinds of pictures (I, P and B pictures), and no error is transferred because it is not used as a data forming reference.

According to the algorithm of the MPEG, the position and synchronization of I-pictures are permitted to be freely selected at a manufacture side. This selection is determined on the basis of such a situations as a random access degree, a scene cut or the like. For example, if the random access degree is weighted, at least two I-pictures are required for one second as shown in FIG. 3A.

Further, the frequency of P-pictures and B-pictures which exist in 30 frames can be freely selected, and it is set in accordance with a memory capacity of an encode means or the like.

The encode means in the MPEG system is designed to rearrange and output a picture data stream so that an efficiency is improved in a decoder.

For example, in the case of FIG. 3A, a frame order (output order of the decoder) to be displayed is set to a Frame-number order shown at a lower side of FIG. 3A. In this case, a P-picture serving as a reference is required before a B-picture in order for the decoder to reconstruct the B-picture. Therefore, at the encoder side, the frame order shown in FIG. 3D is rearranged to a frame order shown in FIG. 3E, and the data stream thus rearranged is output as a picture data stream.

The audio data format of MPEG covers a broad range of coding rate from 32 Kbit/second to 448 Kbit/second, however, the transfer rate of audio data of almost all discs is set to 224 Kbit/second in consideration of facilitation of software manufacturing and high sound quality. In this case, the standard frequency is set to 44.1 KHz which is the same value as the CD-DA.

On a video CD are recorded not only video data and audio data, but also management data with which various controls For reproduction of these data are performed. That is, like the CD-DA, TOC (Table of Contents) and sub codes are recorded on the video CD to indicate the number of programs, the start position (absolute time) of each program, etc. Further, a program number is used as a video CD data track, and various management information is recorded. The video CD data track will be described later.

[2. Track Structure of Video CD]

Figures 4A, 4B:
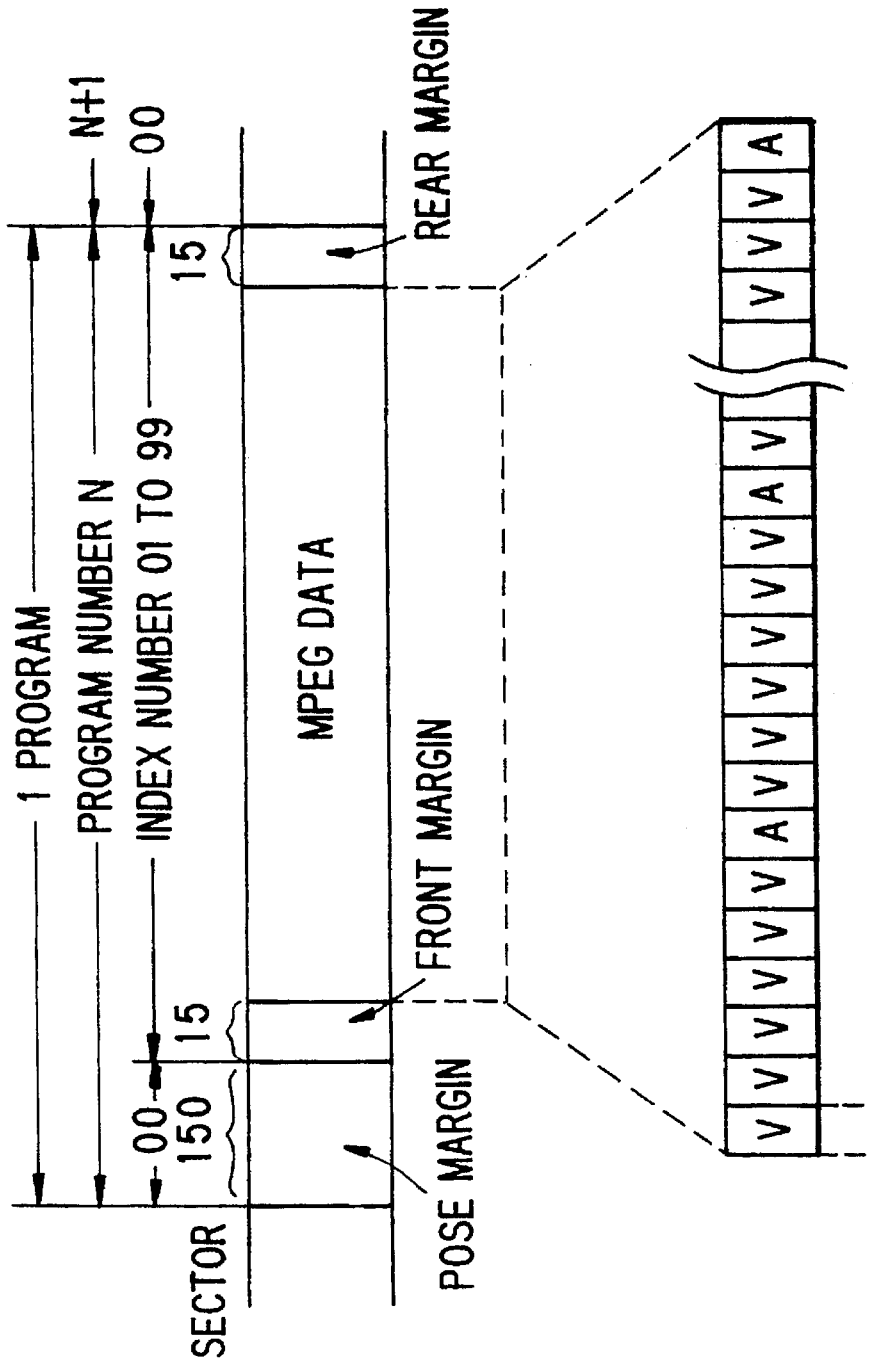
FIG. 4A is a diagram showing a data structure recorded in an unit program.
FIG. 4B is a diagram showing a structure of MPEG data recorded in an unit program.

FIG. 4A shows the data structure of a program in which video and audio data are recorded every unit program.

Pose margins of 150 are provided at the head of a program on the assumption that a search operation is performed on the basis of a program number like the CD-DA. Further, a front margin is provided in 15 sectors which are subsequent to the pose margins, and a rear margin is provided in the last 15 sectors, these sectors being set to empty data areas.

An MPEG data area is set between the Front margin and the rear margin. In the MPEG data area, sectors V serving as picture data and sectors A serving as audio data are arranged in ratio of 6:1 on the average, and are recorded while time-divisionally multiplexed by an interleaving system.

[3. Arrangement on Disc of Video CD]

The structure on disc of CD-DA and video CD is shown in FIG. 5.

In the case of CD-DA, a lead-in area is provided at the innermost peripheral side of the disc as shown in FIG. 5A, and TOC data are recorded in this area. As the TOC data are recorded the start position of each program, the total number of recorded programs, a music play time, etc.

Subsequently to the lead-in area, programs are recorded as program Nos. 1 to n, and a lead-out area is provided at the outermost peripheral position of the disc. Digital audio data which are quantized every 16-bit at a sampling rate of 44.1 KHz are recorded in each program together with sub code data.

On the other hand, the structure on disc of video CD is shown in FIG. 5b.

In the case of the video CD, substantially like the CD-DA. a lead-in area is provided at the innermost peripheral side of the disc and the TOC data are recorded in this area. Subsequently to the lead-in area, programs are recorded as program Nos. 1 to n, and a lead-out area is provided at the outermost peripheral side of the disc.

However, in the case of the video CD, the program No. 1 is not used to record actual video or audio data, but it is used as a video CD data program which serves as a management area. Actual video/audio data are recorded in the program Nos. 2 to n. That is, the program Nos. 2 to n are constructed by the video sectors V and the audio sectors A as shown in FIG. 4B.

In the case of the video CD, a program area in which only audio data are recorded may be provided. In this case, digital audio data which are quantized every 16 bits at a sampling rate of 44.1 KHz are recorded like the CD-DA.

In both the CD-DA and the video CD, the maximum number of recordable programs is equal to 99. Accordingly, 99 programs for the CD-DA and 98 programs for the video CD can be recorded maximum. A program in the video CD corresponds to a section of a continuous moving picture. For example, when an image of Karaoke is recorded, a piece of music corresponds to a program, and in the case of a movie, one chapter usually corresponds one program.

To the video CD data track using the program No. 1 are provided a PVD (Primary Volume Descriptor), a Karaoke basic information area, a video CD information area, a segment play item area and other files (CD-I application programs, etc.).

[4. Video CD Data Track]

Next, the video CD data track which is recorded on the video CD using the program No. 1 will be described.

As shown in FIG. 5C, PVD is disposed in an area starting From an absolute time address of 00 minute/02 second/16 frame on the disc. Further, the Karaoke basic information area is disposed in an area starting from an absolute time address of 00 minute/03 second/00 frame. The video CD information area is disposed in an area starting from an absolute time address of 00 minute/04 second/00 frame.

The segment play item area is disposed in an area starting From the position which is indicated by an address recorded in the video CD information area, and the CD-I application program is disposed in an area starting from the position which is indicated by an address recorded in the PVD.

Basic matters such as a volume structure standard ID, a system identifier, a volume identifier, an album volume number, an album set sequence number, a route directory record, an album identifier, a publisher, an author's name, etc. are recorded in a predetermined format in the PVD (primary volume descriptor) which is disposed in the area starting from the position corresponding to the absolute time address of 00 minute,/02 second/16 frame.

Next, the video CD information is recorded from the absolute time of 00 minute/04 second/00 frame on the disc.

Figure 6:
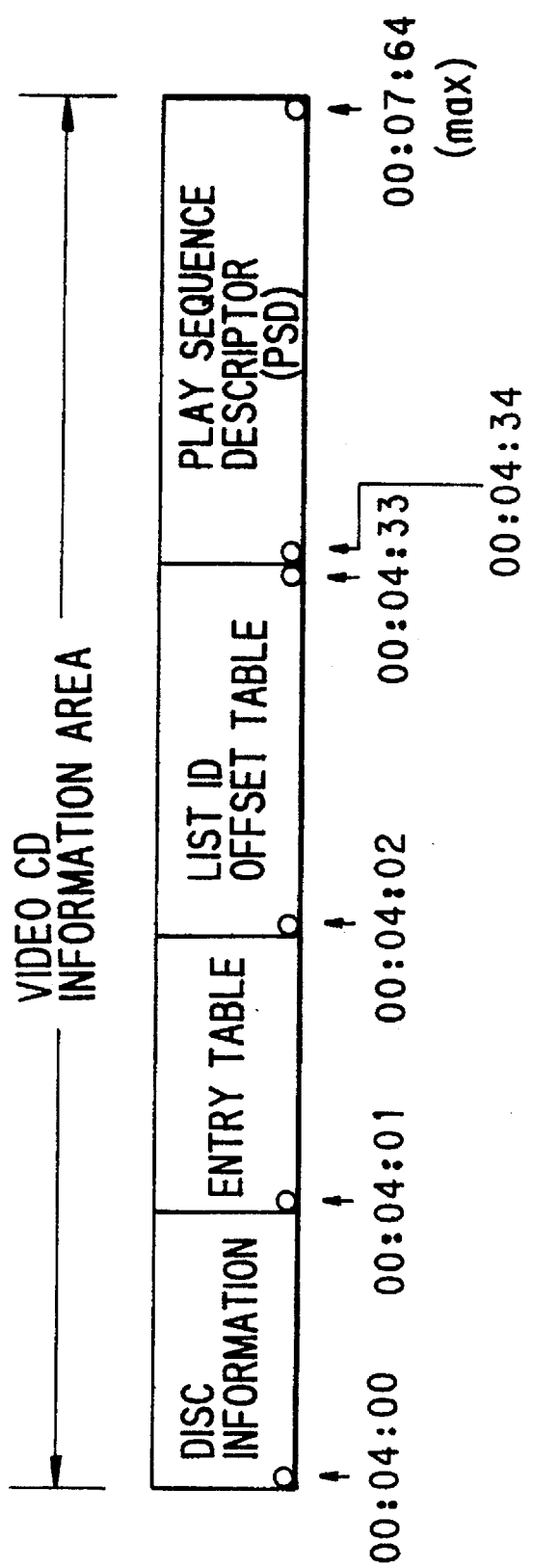
FIG. 6 is a diagram showing a data structure of an information area of the video CD.

As the video CD information are provided disc information, an entry table, a list ID offset table and a play sequence descriptor (PSD) as shown in FIG. 6.

The disc information is disposed in an area starting from an absolute time address of 00 minute/04 second/00 frame, which corresponds to the head position of the video CD information. The list ID offset table is disposed in an area from an absolute time address of 00 minute/04 second/02 frame until an absolute time address of 00 minute/04 second/33 frame. The play sequence descriptor (PSD) is disposed in an area starting From an absolute time address of 00 minute/04 second/34 frame, and it extends to an absolute time address of 00 minute/07 second/64 frame at maximum.

In the disc information disposed from the absolute time address of 00 minute/04 second/00 frame are recorded a video CD system identifier, a version number, an album identifier, a volume number in album, an album set sequence number, a size map of a moving picture track, a status flag, byte size of PSD (play sequence descriptor), a start point of a segment play item area, an offset multiplier, a segment play item content table, etc.

The PSD is constructed as plural lists (section list, play list, end list) which are used for playback control, and each list is recorded as PSD. The playback control is a reproduction system to perform a simple interactive reproduction using a video CD, and it is recorded as PSD in an area From an absolute time address of 00 minute/04 second/34 frame as shown in FIG. 6.

The byte size of the PSD is set so that the PSD can be recorded until the position corresponding to the absolute time of 00 minute/07 second/64 frame at maximum, and its byte size information is also recorded in the disc information because the length of the PSD is variable.

Further, an address at which each list is recorded in the PSD is shown in the list ID offset table shown in FIG. 6.

In the case of the video CD, data of moving pictures, still pictures or sounds whose number is equal to 1980 at maximum can be recorded as a segment play item in the segment play item area shown in FIG. 5C. Each segment play item is used for the playback control. The management information on the segment play item is also recorded in the disc information.

In the video CD,information area shown in FIG. 6, an entry table is disposed in an area starting from an absolute time address of 00 minute/04 second/01 frame. An entry of a predetermined point in an audio/video sequence can be made in the entry table. That is, an index point for each program can be indicated.

An ID identifying an entry file, a version number, the number of entries, etc. are recorded in the entry table, and 500 entries at maximum can be recorded as actual entry points. That is, entry Nos. 0 to 499 can be set.

One entry $ET_{(X)}$ comprises 4 bytes. As shown in FIG. 7A a track (program) number TRK is indicated with one byte of these 4 bytes, and an absolute address, that is, AMIN (minute), ASEC (second) and AFRM (frame) are indicated by the remaining three bytes.

A start position of each program or an index point when a program is subdivided into plural parts is indicated as an entry ($ET_1$, $ET_2$, $ET_3$, . . . ).

Now, it is assumed that the entry table is recorded on a disc as shown in FIG. 7B. That is, "01", "03", "04", . . . are recorded as a program number TRK of each entry, and an absolute address AMIN (minute), ASEC (second) and AFRM (frame) is indicated for each entry. In this case, only one entry is recorded for each program No. 2, 3, 4, . . . . At least start position of a program is recorded as an entry, so that each entry is the start position of each program ($S_2$, $SP_3$, $SP_4$ . . . ).

A disc having an entry table shown in FIG. 7B is a disc on which no index point is set to any program.

On the other hand, with respect to a disc on which index points are set, the entries corresponding to the index points are successively recorded subsequently to the start position of the program. For example, in the entry table of FIG. 7C, there are two entries corresponding to the program No. 2 ($ET_1$, $ET_2$). The first entry $ET_1$ indicates the start position of the program No. 2 ($SP_2$). The next entry $ET_2$ indicates as an index point the position at which the program No. 2 is divided into two parts ($IDX_{21}$).

Furthermore, there are four entries corresponding to the program No. 3 ($ET_3$ to $ET_6$). In this case, the first entry $ET_3$ indicates the start position of the program No. 3 ($SP_3$). The subsequent three entries ($ET_4$, $ET_5$ $ET_6$) indicate as index points the positions at which the program No. 3 is divided into four parts ($IDX_{31}$, $IDX_{32}$, $IDX_{33}$).

That is, when the entry table contains plural entries corresponding to each program, the reproducing device which reads in a video CD data program from a disc can judge that the second and subsequent entries indicate the index positions.

[5. Outline of Reproducing Device]

Next, a reproducing device according to an embodiment of the present invention which can perform the above reproducing operation of the video CD will be described.

The reproducing device of this embodiment is designed to stock five video CD-DAs therein and selectively reproduce them, and it is a so-called exchangeable video CD player.

Figure 8:
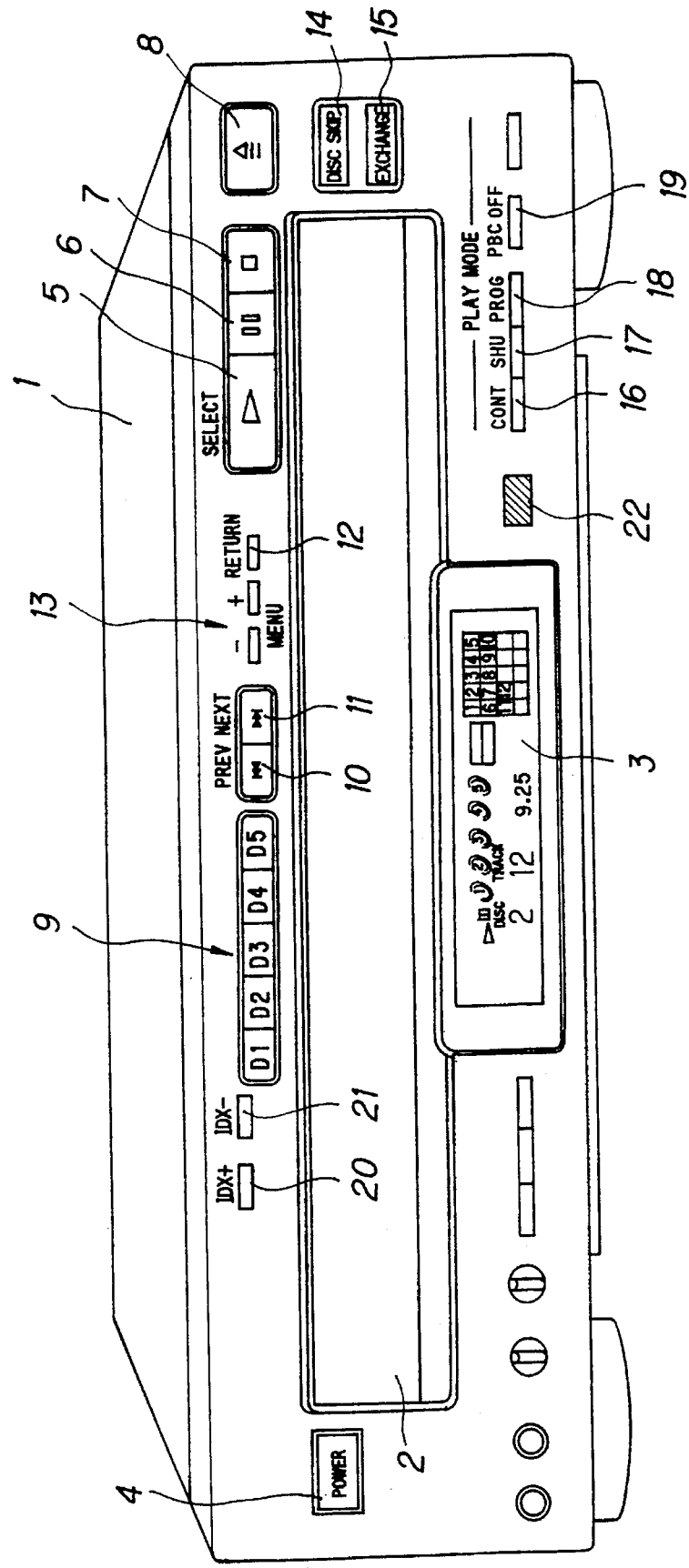
FIG. 8 is a diagram showing an outline of the present invention.

The outline of the reproducing device is shown in FIG. 8.

Reference numeral 1 represents the main body of the reproducing device. Reference numeral 2 represents a disc mount portion provided on a front panel of the reproducing device 1. The disc mount portion 2 has a disc tray which is retractable from and into the disc mount portion 2 and on which five discs can be mounted. The disc tray is designed so that five disc can be mounted thereon while arranged in a horizontal direction, and a desired disc to be reproduced can be selected by rotating the five discs like a roulette.

Reference numeral 3 represents a display unit which is constructed by a liquid crystal panel, etc., and it displays an operation status of the reproducing device, a mode, a selected disc number, a play time, etc. Furthermore, various keys to be manipulated by an user are provided on the front panel. Reference numeral 4 represents a power on/off key.

Reference numeral 5 represents a reproduction key, and the reproduction key 4 is also used as selection key (selection enter key) in a playback control operation. Reference numeral 6 represents a temporary stop key, reference numeral 7 represents a stop key, and reference numeral 8 represents an eject key.

Reference numeral 9 represents disc selection keys. Five keys "D1" to "D5" are prepared as the disc selection keys, and these keys correspond to five discs which are mounted on the disc tray. For example, upon push of the key "D1", a disc which is mounted at a first mount position on the disc tray is loaded to the position of an optical head in the reproducing device, and then subjected to a reproducing operation.

Reference numerals 10 and 11 represent keys for music selection. Specifically, the reference numeral 10 represents a head search key in a program-number reducing direction (backward heat search key), and the reference numeral 11 represents a head search key in a program-number increasing direction (forward head search key). The backward head search key 10 is also used as a previous key, and it is used for a previous operation in the playback control operation. Further, the forward head search key 11 is also used as a next key, and it is used for a next operation in the playback control operation.

Reference numeral 12 represents a return key, and it is used for a return operation in the playback control operation. Reference numeral 13 represents a +/− selection key, and it is used for a selection operation on a menu frame in the playback control operation. That is, a selection branch number is selected from the menu frame by the +/− selection key, and a select operation is carried out by the reproduction key at the time when a selection branch number is indicated, whereby the selection on the menu frame is completed.

Reference numeral 14 represents a disc skip key, and reference numeral 15 represents a disc exchange key. Reference numerals 16 to 19 represent play mode selection keys. The reference numeral 16 represents a normal reproduction mode key. In the case where reproduction is performed on a disc which is added with a playback control function, the playback control operation is automatically started by pushing the normal reproduction mode key 16.

Reference numeral 17 represents a shuffle reproduction mode key, and reference numeral 18 represents a program reproduction mode key. Reference numeral 19 represents a PBC off key, and a PBC mode is switched off by the PBC off key 19. That is, upon push of the PBC off key 19 when a disc having the playback control function is loaded, the menu reproduction operation based on the PBC mode is shifted to a normal continuous reproduction operation.

Reference numerals 20 and 21 represent operation keys for index search. The reference numeral 20 represents an index+search key (hereinafter referred to as "IDX+ key", and the reference numeral 21 represents an index—search key (hereinafter referred to as "IDX− key"). Through manipulation of the IDX+ key 21 or the IDX− key 22, an user can perform an access to an index point in a program.

Reference numeral 22 represents an infrared-ray receiver. When a command signal of, infrared rays is transmitted from a remote commander (not shown), the command signal is received by the infrared-ray receiver 22 and converted to an electrical signal, thereafter the electrical signal thus converted being transmitted to a system controller in the reproducing device.

[6. Circuit Block of Reproducing Device]

Figure 9:
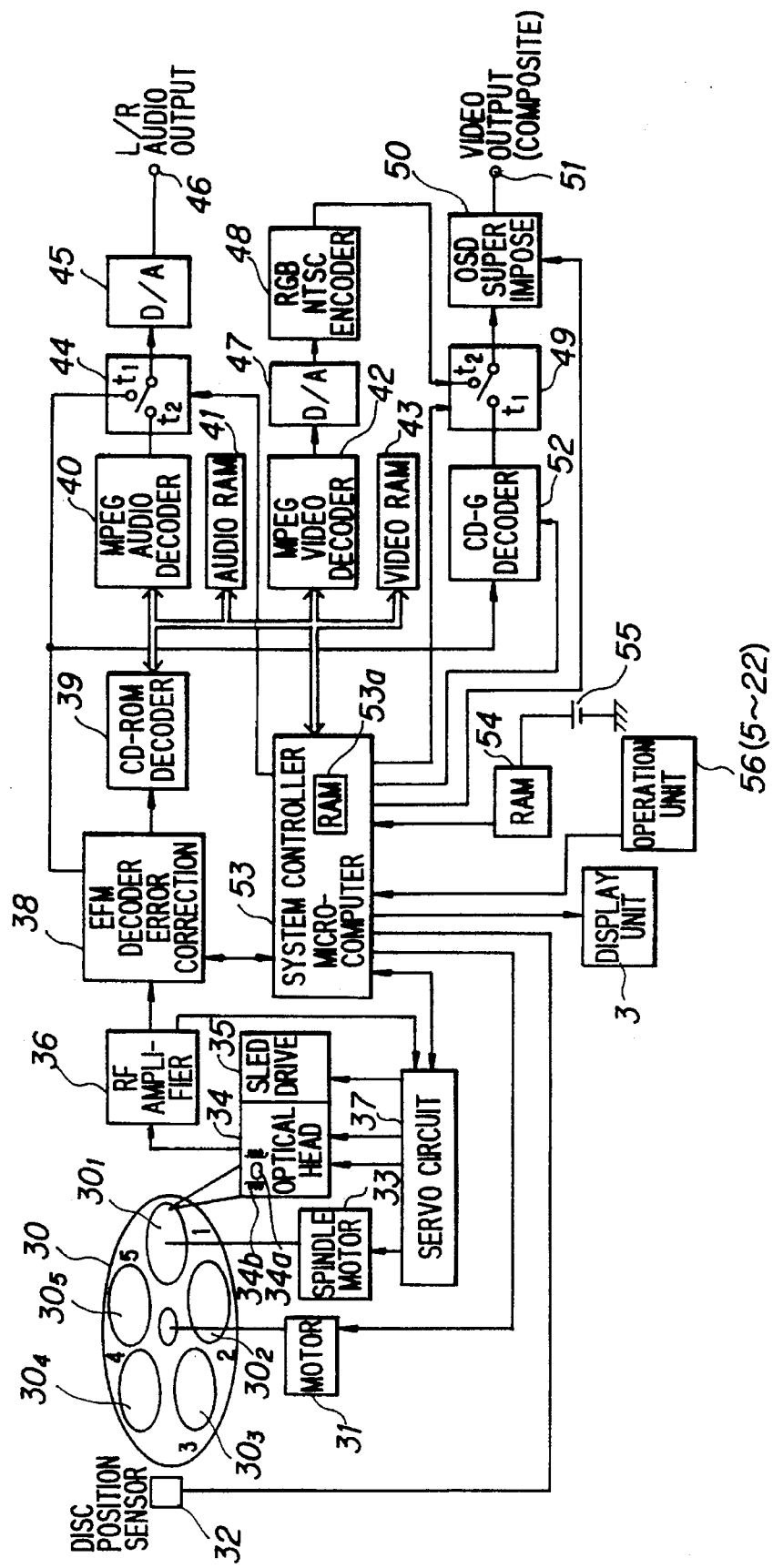
FIG. 9 is a block diagram of the embodiment.

FIG. 9 shows the internal construction of the reproducing device.

In FIG. 9. reference numeral 30 represents the disc tray. The disc tray 30 is provided with disc mounts $30_1$ and $30_5$ on which respective five discs can be individually mounted. The disc tray 30 is rotatable by a motor 31, and a desired disc mount $30_X$ is fed to the position corresponding to the optical head 34 through the rotational motion of the disc tray 30. That is, the disc which is mounted on the disc mount $30_X$ is loaded to the position corresponding to the optical head 34. Reference numeral 32 represents a disc position sensor, and on the basis of the output of the disc position sensor, the system controller 53 can grasp a current loading status, that is, it can grasp which disc mount $30_X$ is located at the position corresponding to the optical head 34.

The loaded disc is chucked so as to be rotationally driven by a spindle motor 33. Thereafter, the disc is irradiated with a laser beam from the optical head 34 while rotated by the spindle motor 33, and information is read out from the disc on the basis of the reflection light from the disc.

The optical head 34 is equipped with a laser diode serving as a laser output means, an optical system comprising a polarizing beam splitter, an objective lens, etc., and a detector for detecting the reflection light. An objective lens 34a is supported by a biaxial mechanism 34b so as to be displaceable in a radial direction of the disc and in such a direction that it can approach to and move away from the disc. Reference numeral 35 represents a sled mechanism for driving the optical head 34 in the disc radial direction.

Through the reproducing operation, the information detected from the disc by the optical head 34 is supplied to an RF amplifier 36. The RF amplifier 36 extracts a reproduction RF signal, a tracking error signal, a focus error signal, etc. by conducting calculation processing on the supplied information. The extracted reproduction RF signal is supplied to a decoder unit 38 to be subjected to an EFM (Eight-Fourteen Demodulation) and error correction. Further, P, Q channel sub code data are also taken out and supplied to the system controller 53.

The tracking error signal and the focus error signal are supplied to a servo circuit 37. The servo circuit 37 produces various kinds of servo driving signals on the basis of the tracking error signal, the focus error signal, a track jump instruction and an access instruction from the system controller 53, rotational speed detection information from the spindle motor 33, etc., and controls the biaxial mechanism 34b and the sled mechanism 35 to perform focus and tracking control, whereby the spindle motor 33 is controlled at a constant linear velocity (CLV).

Reference numeral 39 represents a CD-ROM decoder. When a disc under production is based on a CD-ROM format, for example, a video CD, the CD-ROM decoder 39 performs decode processing according to the CD-ROM format. Of the signals which are decoded by the CD-ROM decoder 39, various disc information recorded in the video CD data program (program No. 1) is taken into an RAM 53a of the system controller 53.

Furthermore, the audio data which are decoded by the CD-ROM decoder 39 are supplied to the MPEG audio decoder 40. The MPEG audio decoder 40 performs its decode operation and outputs decode audio signals at a prescribed timing using an audio RAM 41.

The video data which are decoded by the CD-ROM decoder 39 are supplied to an MPEG video decoder 42. The MPEG video decoder 42 performs its decode operation and outputs decode video signals (RGB output) at a prescribed timing using a video RAM 43.

Reference numeral 44 represents a switching unit which is switched in accordance with the type of a disc to be reproduced. When a disc to be reproduced is a CD-DA, its reproduction signal is subjected to decode processing such as EFM modulation, CIRC, etc. in the decoder unit 38 to obtain a digital audio signal.

During the CD-DA reproduction, the system controller 53 connects the switch unit 44 to a $t_1$ terminal. Accordingly, the digital audio signal is converted to an analog audio signal in a D/A converter 45, and then output to an external equipment such as an amplifying circuit or amplifier at a subsequent stage.

When the disc to be reproduced is a video CD, the audio data are obtained from the MPEG audio decoder 40. During the reproduction of the video CD, the system controller 53 connects the switch unit 44 to a $t_2$ terminal. Accordingly, the digital audio signal from the MPEG audio decoder 40 is converted to an analog audio signal in the D/A converter 45, and then output from an audio output terminal to an external equipment such as an amplifying circuit or amplifier at a subsequent stage.

In the reproduction of the video CD, RGB video data are obtained as an output of the MPEG video decoder 42, and the RGB video data are converted to an RGB analog signal in an RGB/NTSC encoder 48. The RGB signal is converted to a composite video signal of NTSC system, and then supplied to the $t_2$ terminal of the switch unit 49.

During reproduction of the video CD, the system controller 53 connects the switch unit 49 to the $t_2$ terminal, and thus the composite video signal of NTSC system is supplied from the video output terminal 51 through an OSD processing unit 50 to a monitor device or the like to thereby perform a video output operation. A desired character display can be performed in an output picture by operating the OSD processing unit 50 on the basis of an instruction from the system controller 53.

When the disc to be reproduced is a CD-DA and further it is a CD-G, still-image data are read out From R to w channels of sub codes. The still-image data are supplied to a CD-G decoder 52 to be decoded, and then output as a composite video signal of NTSC system (still image). During the reproduction of the CD-DA, the switch unit 49 is connected to the $t_1$ terminal, and thus the video signal which are reproduced from the CD-G is supplied From the video output terminal 51 through the OSD processing unit 50 to the monitor device or the like, thereby performing a video output operation. In this case, a desired character display can be also performed in an output video by the OSD processing unit 50.

Reference numeral 54 represents a RAM, and memory data of the RAM are backed up by a back-up power source 55. In the RAM 54 are recorded those data which must be prevented from being lost when the power source is off. It is needless to say that it may be replaced by EEP-ROM.

Reference numeral 56 represents an operation input unit which is manipulated by an user, and the various kinds of operation keys (5 to 21) and the infrared-ray receiver 22 (and remote commander) shown in FIG. 8 correspond to this operation input unit. When the reproduction operation is carried out on the disc, the management information recorded on the disc, that is, the TOC and the sub code data are read out and then supplied the system controller 53. The system controller 53 displays a reproduction time, etc. on the display unit 3 in accordance with the management information.

[7. Index Search Operation]

An index search operation in the reproducing operation thus constructed will be described. In this embodiment, when an index search operation is started, an entry table is checked for a program which is being reproduced from a video disc or a access target program. If an index point is set on the entry table, the index search operation is carried out in accordance with the set index point. If no index point is set, the system controller 53 sets an index point through a predetermined calculation processing to performs the index search operation.

Figure 10:
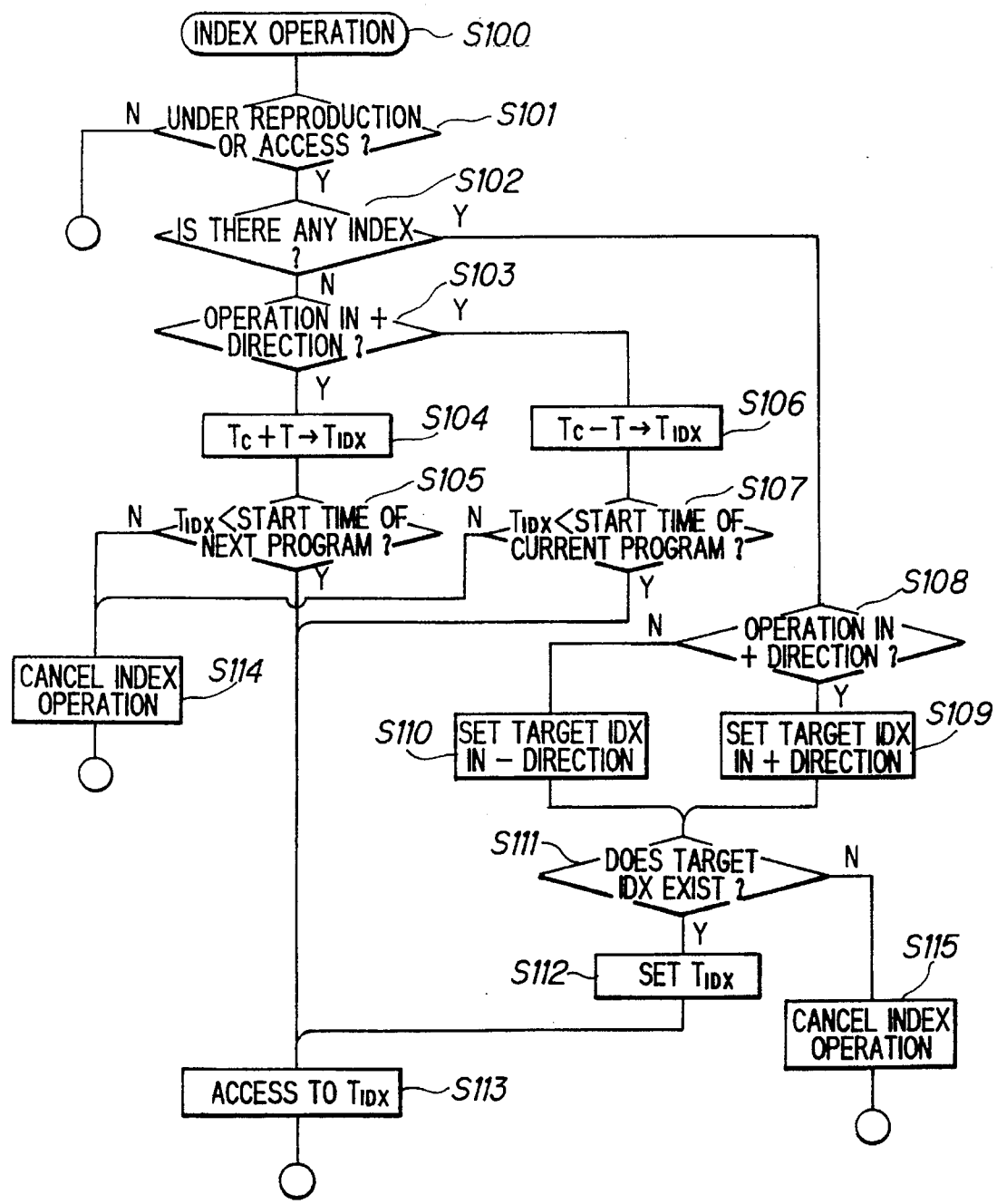
FIG. 10 is a flowchart for a control operation when an index search is carried out in this embodiment.
Figure 13A:
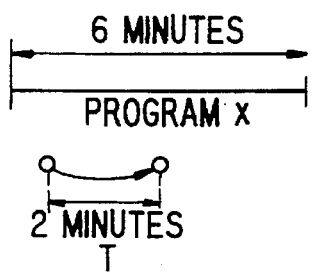
FIG. 13A is a diagram showing a calculation method of an index point of the embodiment.
Figure 13B:
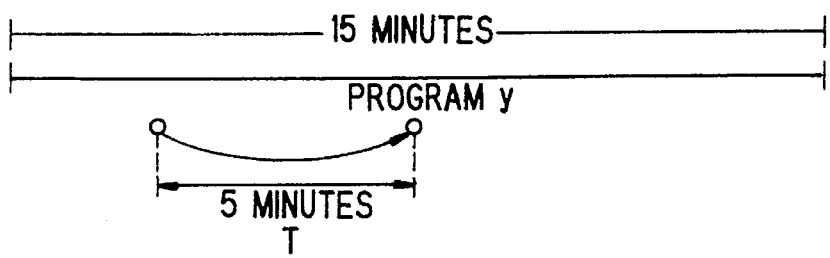
FIG. 13B is a diagram showing another calculation method of an index point of the embodiment.
Figure 14:
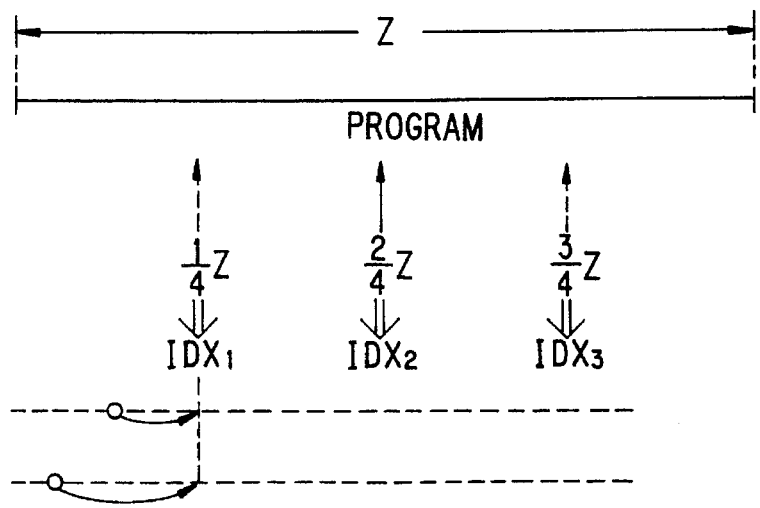
FIG. 14 is a diagram showing a state when a fixed index point is provided in the embodiment.

The index search processing of the system controller 53 according to this embodiment is shown in FIG. 10.

Upon operation of the IDX+ key 21 or IDX– key 22 (S100), the system controller 53 first judges whether any program is currently being reproduced or accessed (S101). In the other cases, no index search operation is carried out.

IF it is under reproduction or access, it is judged whether an index point is set to the target program (the program under reproduction if the program is being reproduced, or a program which is currently an access target if the program is being accessed) (S102). This judgment is performed by referring to the data of the entry table which are stored in the RAM 53a. If there is one entry for the target program, no index point is set. If there are two or more entries, second and subsequent entries indicate index points, so that the setting of the index point can be recognized.

If any index point is set, the process goes to processing at step S108 and subsequent steps. First, it is judged whether the index search operation is in a plus (+) direction or in a minus (–) direction. That is, it is judged whether the IDX+ key 21 is operated or the IDX– key 22 is operated (S108).

If the IDX+ key 21 is operated, "1" is added to an entry number at a currently reproducing point or a current access target point, and the addition result is set as a target IDX. That is, an entry number which is subsequent to the current entry number (in an absolute-time increasing address direction) is set as a target IDX (S109).

Conversely, if the IDX– key 22 is operated, an entry number which is preceding to the current reproduction point or access target point (in an absolute-time decreasing direction) is set as a target IDX (S110).

In step S111, it is judged from the entry table whether any target IDX exists.

If any target IDX exists in the entry table, an address (AMIN, ASEC, AFRM) recorded at the target IDX is set as a target address $T_{IDX}$ of the index search (S112), and in step S113 an access processing to the target address $T_{IDX}$ is carried out.

If no target IDX exists in the entry table, an index point corresponding to the index search operation is judged not to exist, so that the index search operation is canceled (S115). Specifically, the cancel of the index search operation is performed by invalidating the index search operation and continuing the reproducing operation when the index search operation is carried out during the reproducing operation. In the case where the index search operation is carried out during an access, only the access until the access target is carried out. The above processing is a normal index search processing.

Next, if it is judged in step S102 whether no index point is set, the process goes to processing at a step S103 and subsequent steps.

First, it is judged whether the index search operation is in a plus (+) direction or a minus (–) direction. That is, it is judged whether the IDX+ key 21 is operated or the IDX– key 22 is operated (S103).

If the IDX+ key 21 is operated, a predetermined address amount T is added to a current reproduction point or an access target point when it is under access, and the addition result is set as a target address $T_{IDX}$ of the index search (S104). In this case, the address amount T may be set to a preset time (for example, 5 minutes). Thereafter, it is judged whether the target address $T_{IDX}$ is beyond the start address of a next program (a next program to the target program when it is under access) (F105). The start address of a next entry is judged from the entry table. It is recorded as the TOC information, and thus the TOC information may be used.

If it is judged in step S103 that the IDX– key 22 is operated, a predetermined address amount T is subtracted from the address Tc of a current reproduction point or an access target point (if it is under access), and the calculated result is set as a target address $T_{IDX}$ of the index search (S106). Thereafter, it is judged whether the target address $T_{IDX}$ is smaller than the start address of the current program (target program (if it is under access) (S107).

If a positive judgement is made in step S105 or S107, the process goes to step S113 to perform an access processing to the target address $T_{INDX}$.

If a negative judgement is made in step S105 or S107, the target address is judged to be contained in a program other than the target program, and thus the index search operation is canceled. That is, if the index search operation is carried out under reproduction, the reproduction is continued with no interception. On the other hand, if the index search operation is carried out under access, the access until the access target is merely carried out.

The operation which is performed through the processing as described above is shown in FIGS. 11A to 11H and FIGS. 12A to 12H. These figures show a situation in which index points ($IDX_{31}$, $IDX_{32}$) are set for the program No. 3 and no index point is set for the program No. 4 on a disc.

FIGS. 11A to 11H show various situations in the case where the program No. 3 is set as a target program in the index search operation As shown in FIG. 11A, it is assumed that $ET_2$, $ET_3$ and $ET_4$ are recorded as entries for the program No. 3 on the entry table. That is, a status where index points ($IDX_{31}$, $IDX_{32}$) are set at positions on the program No. 3 is considered.

FIG. 11B shows a situation where the IDX+ key 21 is operated when the reproducing operation is carried out at a reproduction point $PB_1$ on the program No. 3.

In this case, in step S109 an entry $ET_3$ which is shifted from the current point $PB_1$ in the plus (+) direction is set as a target IDX. That is, the entry serving as $IDX_{3\ 1}$ is set as a target IDX, and subsequently if it is confirmed in step S111 that the entry $ET_3$ serving as the index point $IDX_{31}$ exists on the entry table, the process goes to step S113 to perform the index access operation as shown in FIG. 11B.

FIG. 11C shows a situation where the IDX– key 22 is operated when the reproducing operation is carried out at a reproduction point $PB_2$ on the program No. 3.

in this case, in step S110 an entry $ET_4$ which is shifted from the current point $PB_2$ in the minus (–) direction is set as a target IDX. That is, the entry serving as $IDX_{32}$ is set as a target IDX, and subsequently if it is confirmed in step S111 that the entry $ET_4$ serving as the index point $IDX_{32}$ exists on the entry table, the process goes to step S113 to perform the index access operation as shown in FIG. 11C.

FIG. 11D shows a situation where the IDX+ key 21 is operated when the reproducing operation is carried out on the reproduction point $PB_3$ on the program No. 3. In this case, an entry $ET_5$ is set as a target IDX. However, the entry $ET_5$ is an entry on the program No. 4, and thus the entry $ET_5$ serving as the index point of the program No. 3 does not exist in the entry table, so that the operation of the IDX+ key 21 is canceled as shown in FIG. 11D and no index access is carried out.

FIG. 11E shows a situation where the IDX– key 22 is operated when the reproducing operation is carried out at a reproduction point $PB_3$ on the program No. 3. In this case, the entry $ET_2$ is set as a target IDX. However, the entry $ET_2$ indicates the start position of the program No. 3, and thus the entry $ET_2$ serving as the index point does not exist in the entry table, so that the operation of the IDX– key 22 is canceled as shown in FIG. 11E and no index access is carried out. However, in this case, the start position $SP_3$ of the program No. 3 is recorded as the entry $ET_2$ on the entry table, and the processing may be set so that the access to the program start position $SP_3$ is performed in such a situation.

FIG. 11F shows a situation where the access operation to the program No. 3 is carried out in the course of the execution of the program No. 2 and the IDX+ key 21 is also operated during the program access.

In this case, the target program of the index search is the program No. 3, and the target of the program access operation is the start position $SP_3$ of the program No. 3. The target IDX on the index search is the entry $ET_3$ that is, the index point $IDX_{31}$, and an access operation shown by a solid line is performed.

FIG. 11G shows a situation where the backward program access operation from the reproduction position $PB_4$ is carried out on the program No. 3 and the IDX+ key 21 is operated during the access operation.

In this case, the target of the program access operation is the start position $SP_3$ of the program No. 3, however, the target IDX is set to the entry $ET_3$, that is, the index point $IDX_{31}$ through the index search operation, so that an access operation shown by a solid line is performed.

FIG. 11H shows a situation where the backward program access operation from the reproduction position $PB_4$ is carried out on the program number No. and the IDX– key 22 is operated during the access operation. In this case, the target of the program access is the start position $SP_3$ of the program No. 3 and no index point on the program No. 3 exists behind the start position $SP_3$, so that the operation of the IDX– key 22 is canceled and only the program access shown in FIG. 11 is executed.

Next, FIGS. 12A to 12H show various situations in the case where the program No. 4 is set as a target program in the index search operation.

As shown in FIG. 12A, no index point is assumed to be set on the program No. 4.

FIG. 12B shows a situation where the IDX+ key 21 is operated when the reproducing operation is carried out at a reproduction point $PB_{10}$ on the program No. 4. In this case, in step S104 a position which is shifted in the plus position from the current point $PB_{10}$ by an address amount (time) T is set as a target address $T_{IDX}$, and if it is confirmed in step S105 that the target address $T_{IDX}$ does not reach the program No. 5, the index access operation until the point $PB_{11}$ is executed as shown in FIG. 12B.

FIG. 12C shows a situation where the IDX– key 22 is operated when the reproducing operation is carried out at a reproduction point $PB_{12}$ on the program No. 4. In this case, in step S106 a position which is shifted in the minus direction from the current point $PB_{12}$ by the address amount (time) T is set as a target address $T_{IDX}$, and if it is confirmed in step S107 that the target address $T_{IDX}$ does not reach the program No. 3, the index access operation until the point $PB_{13}$ is executed as shogun in FIG. 12C.

FIG. 12D shows a situation where the IDX+ key 21 is operated when the reproducing operation is carried out at a reproduction point $PB_{14}$ on the program No. 4. In this case, a target address $T_{IDX}$ which corresponds to ($PB_{14}$+T)

becomes an address in the program No. 5. Therefore, the operation of the IDX+ key 21 is canceled and no index access is executed as shown in FIG. 12D.

FIG. 12E shows a situation where the IDX– key 22 is operated when the reproducing operating is carried out at a reproduction point $PB_{15}$ on the program No. 4. In this case, a target address $T_{IDX}$ which corresponds to $(PB_{15}-T)$ becomes an address in the program No. 3. Therefore, the operation of the IDX– key 22 is canceled and no index access is carried out as shown in FIG. 12E. In this case, the processing may be set so that the access to the program start position $SP_4$ is performed.

FIG. 12F shows a situation where the program access operation of the program No. 4 is carried out in the course of the execution of the program No. 3 and the IDX+ key 21 is operated during the execution of the program access. In this case, the target of the program access is the start position $SP_4$, and the target address $T_{IDX}$ of the index search is set to the address of $(SP_4+T)$ as represented as $PB_{16}$. Therefore, the access operation shown by a solid line is carried out.

FIG. 12G shows a situation where the access operation to the program No. 4 is carried out during the execution of the program No. 5 and the IDX+ key 21 is operated during the execution of the program access. In this case, the target of the program access operation is the start position $SP_4$, and the address of $(SP_4+T)$ is set as the target address $T_{IDX}$ by the index search operation. Accordingly, as shown by a solid line, the access operation directing to the point $PB_{16}$ is carried out.

FIG. 12H shows a situation where the program access operation is carried out on the program No. 4 during the execution of the program No. 5 and the IDX– key 22 is operated during the program access operation. In this case, the target of the program access operation is the start position SP of the program No. 4 and thus the address of $(SP_4-T)$ is contained in the program No. 3, so that the operation of the IDX– key 22 is canceled and only the program access operation is executed as shown in FIG. 12H.

As is apparent from the foregoing operations, according to this embodiment, the index search is executed on a program in which no index point is set, so that it is very suitable for such a situation that an user wants to search his favorite scene.

Furthermore, a normal index search is operation on a program in which an index point is set, so that an access to an optimum index point which is set by a disc manufacture can be realized.

In the above embodiment, the address amount T is added to (or subtracted from) the current address to calculate an index point when no index point exists, and the address amount T is set to a fixed value. However, in place of this calculation manner, various manners may be considered as a manner of setting the address amount T.

As one manner, the address amount T may be set to a variable value in accordance with the play time of a program. For example, if the address amount T is set to ⅓ of the play time of a program, the index search operation could be performed at a time interval of 2 minutes for a program x having 6-minute play time, and also the index search operation could be performed at a time interval of 5 minutes for a program y having 15-minute play time.

Furthermore, fixed index points may be set to a program. For example, in the case of a program having a play time of Z, points of ¼, ½, ¾ of the play time may be fixed as index points $IDX_1$ to $IDX_3$. In this case, these points are treated as being equivalent to the index points set on the entry table to perform the search operation.

It is needless to say that other various calculation manners of the access target of the index search can be used.

What is claimed is:

1. A reproducing device for reproducing a recording medium on which plural programs and management information to manage the plural programs are recorded, comprising:

reproducing means for reproducing the management information and the programs from the recording medium;

judgment means for judging on the basis of the management information reproduced by said reproducing means whether index information to subdivide a program is recorded on the recording medium;

index access instruction means for instructing an access to an index point on a desired program;

setting means for judging on tile basis of a judgement result of said judgment means whether any index information exists in a program serving as an index access target when the access of the index point is instructed by said index access instruction means, and setting an index point through a predetermined calculation processing when no index information exists in the program serving as the index access target; and control means for performing a control operation to access to the set index point.

2. The reproducing device as claimed in claim 1, wherein the predetermined calculation processing is a processing of offsetting 1/n (n represents an integer above 2) of the length of the program serving as the index access target from a position which is being reproduced when said index access instruction means instructs an access.

3. The reproducing device as claimed in claim 1, wherein the predetermined calculation processing is a processing of offsetting a fixed address from a position which is being reproduced when said index access instruction means instructs an access.

4. The reproducing device as claimed in claim 1, wherein the program serving as the index access target when said index access instruction means instructs an access is a program which is being reproduced when said index access instruction means instructs the access.

5. The reproducing device as claimed in claim 1, wherein the program serving as the index access target when said index access instruction means instructs an access is a program which is an access target when said index access instruction means instructs the access.

6. The reproducing device as claimed in claim 2, wherein the program serving as the index access target when said index access instruction means instructs an access is a program which is being reproduced when said index access instruction means instructs the access.

7. The reproducing device as claimed in claim 2, wherein the program serving as the index access target when said index access instruction means instructs an access is a program which is an access target when said index access instruction means instructs the access.

8. A reproducing device for reproducing a recording medium on which plural programs and management information to manage the plural programs are recorded, comprising:

a reproducer for reproducing the management information and the programs from the recording medium;

a detector for detecting, on the basis of the management information reproduced by said reproducer, whether index information to subdivide the programs are recorded on the recording medium;

an index access operator for instructing an access to an index point on a desired program;

a calculator for judging on the basis of a result from said detector whether index information exists in a program serving as an index access target when said index access operator is instructed, and setting an index point through a predetermined calculation processing when no index information exists in the program serving as the index access target; and a controller for performing a control so as to access to the set index point.

9. An access method of accessing an index point to subdivide a recording medium on which plural programs and management information to manage the plural programs are recorded, comprising the steps of:

(1) judging whether an access to an index point is instructed;

(2) judging on the basis of the management information whether a program serving as an access target is provided with index information to subdivide the program when the access to the index point is instructed in said step (1);

(3) setting an index point on the basis of a predetermined calculation when no index information is judged to be recorded in said step (2); and (4) accessing to the index point set in said step (3).

10. The access method as claimed in claim 9, further comprising a step of accessing to the index point on the basis of the index information when the index information is judged to be recorded in said step (2).

11. The access method as claimed in claim 10, further comprising a step of canceling the access to the index point when the set index point is beyond the area of a program serving as an access target.

* * * * *